(12) United States Patent
Treisman et al.

(10) Patent No.: US 8,549,393 B2
(45) Date of Patent: Oct. 1, 2013

(54) GENERATION OF ELECTRONIC FORMS

(75) Inventors: Howard Grant Treisman, Manly (AU); Philip Raeburn Copeland, Manly (AU)

(73) Assignee: Avoka Technologies Pty Ltd, Manly, New South Wales (AU)

( * ) Notice: Subject to any disclaimer, the term of this patent is extended or adjusted under 35 U.S.C. 154(b) by 178 days.

(21) Appl. No.: 12/881,916

(22) Filed: Sep. 14, 2010

(65) Prior Publication Data

US 2011/0066934 A1 Mar. 17, 2011

(51) Int. Cl.
*G06F 17/00* (2006.01)
*G06F 15/16* (2006.01)

(52) U.S. Cl.
USPC ........... 715/222; 715/234; 715/236; 715/760; 715/908; 709/203; 709/217

(58) Field of Classification Search
USPC ................. 715/200, 204, 209, 221, 229, 231, 715/254, 255, 256, 273, 203, 205, 222, 224, 715/226, 234, 236, 239, 249, 700, 760, 762, 715/788, FOR. 223, FOR. 233, FOR. 236, 715/FOR. 239, FOR. 253, FOR. 261; 709/201, 709/202, 203, 217, 218, 219
See application file for complete search history.

(56) References Cited

U.S. PATENT DOCUMENTS

| | | | | |
|---|---|---|---|---|
| 7,281,018 | B1 * | 10/2007 | Begun et al. | 1/1 |
| 7,313,757 | B2 * | 12/2007 | Bradley et al. | 715/222 |
| 7,430,711 | B2 * | 9/2008 | Rivers-Moore et al. | 715/221 |
| 7,725,834 | B2 * | 5/2010 | Bell et al. | 715/764 |
| 7,734,995 | B1 * | 6/2010 | Saikaly | 715/200 |
| 7,900,132 | B2 * | 3/2011 | Matveief et al. | 715/224 |
| 2002/0194219 | A1 * | 12/2002 | Bradley et al. | 707/506 |
| 2007/0300145 | A1 * | 12/2007 | Perelman et al. | 715/505 |
| 2008/0098291 | A1 * | 4/2008 | Bradley et al. | 715/223 |

* cited by examiner

*Primary Examiner* — Maikhanh Nguyen
(74) *Attorney, Agent, or Firm* — IPLM Group, P.A.

(57) ABSTRACT

A computerized system, method, computer program product, client processing system and/or server processing system for generating electronic forms are disclosed. In particular, the computerized system is configured to obtain selection data indicative of a selected form template including one or more component templates; present a form composition environment including a plurality of components available for composing a form, wherein the plurality of components available includes at least one templated component being a modification of a base component defined by one of the component templates; generate form composition data indicative of a user composing, within the form composition environment, a form composition using at least one of the templated components; and generate the electronic form based upon the form composition data.

13 Claims, 8 Drawing Sheets

GENERATION OF ELECTRONIC FORMS

CROSS-REFERENCE TO RELATED APPLICATIONS

This application claims priority from Australian Provisional Application No. 2009904467, filed on Sep. 15, 2009. The entire disclosure and contents of the above application is hereby incorporated by reference.

TECHNICAL FIELD

The present invention generally relates to the generation of electronic forms.

BACKGROUND

Designing electronic forms is a complex process which requires intimate knowledge of the business needs satisfied by the form, as well as the technical details of the technology that renders the form.

A common format which is used to present electronic forms is the Portable Document Format (PDF). The PDF utilises a specification for a Form Definition Language known as XFA (XML Forms Architecture, also known as XDP).

A design tool which is available for generating electronic forms in the PDF format is Adobe LiveCycle Designer ES. This design tool allows a developer to design forms conforming to the XFA specification, in a graphic design environment. These forms can be deployed as a PDF file which in turn contains the XFA form definition. A run-time environment, included as part of Adobe Reader/Acrobat, allows end users to open and interact with XFA forms.

XFA is an XML-based description of the layout and behaviour of a form. Each field on the form is described by a snippet of XML, containing many sub-elements and attributes. The form is made up of a collection of these objects. The containership of objects and their relative positions also contributes to the layout and functionality of the form when it runs within Acrobat Reader or Acrobat. The behaviour of the form at runtime can be controlled through the use of properties against the objects such as mandatory or display format properties, and also through the use of programming languages supported by the XFA specification.

However, the generation of XFA forms using current design tools has a number of problems.

In particular, creation of objects and forms that look and function in a particular way is difficult, because of the large number of element and attribute values that need to be configured for each object in order to achieve the desired effect. When a form is required that satisfies organisational specifications, such as the use of an organisation's corporate colours, it is necessary that each object in the form is changed individually which can be a tedious task.

Additionally, the layout of fields in the form is a complex relationship between their individual properties, the container that contains the object, and the other objects within the same container. This complexity makes it difficult to obtain the desired effect, or to predict the form's behaviour.

Whilst the use of re-usable objects has been provided in design tools for generating electronic forms, re-usable objects suffer from the problem of being copied into the form rather than referenced. In the event that the re-usable object in each form needs to be altered, each re-usable object in each form must be modified which is time consuming, particularly where an organisation has a large number of forms.

Re-usable fragments have also been made available in design tools for electronic forms. However, re-usable objects also suffer from the problem of being completely self-contained thereby preventing the user to modify or change properties of the re-usable fragment whilst designing the form. Therefore, if a re-usable fragment needs to be changed, it is necessary to delete the re-usable fragment and insert an altered re-usable fragment which again is time consuming.

Therefore, there is a need for a method, system, computer program product, client processing system, and/or server processing system for generating electronic forms which overcomes or at least ameliorates one or more of the above mentioned disadvantages, or provides a commercial alternative.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

In broad aspects there is provided a method, system, computer program product, server processing system, and/or client processing system for generating electronic forms.

In another broad aspect there is provided a server processing system for generating an electronic form, wherein the server processing system is in communication with a client processing system as part of a distributed system, wherein the server processing system is configured to:

receive, from the client processing system, selection data indicative of a selected form template including one or more component templates;

transfer, to the client processing system, environment data indicative of a form composition environment including a plurality of components available for composing a form, wherein the plurality of components available includes at least one templated component being a modification of a base component defined by one of the component templates;

receive, from the client processing system, form composition data indicative of a user composing, within the form composition environment, a form composition using at least one of the templated components;

generate the electronic form based upon the form composition data; and transfer, to the client processing system, the generated electronic form.

In one embodiment, the form composition data includes a form definition file including one or more references to at least one of the component templates indicating that one or more respective templated components are included in the form composition, wherein the server processing system is configured to:

use each reference in the form definition file to obtain the respective component template;

determine, using the respective component template, the respective base component associated therewith; and generating, the electronic form using the form definition file, the respective base component and the respective component template.

In another embodiment, each component template defines one or more property modifications to the respective base component, wherein the server processing system applies the one or more modifications to the respective base component when generating the electronic form.

In an optional embodiment, the one or more property modifications define a subset of modifiable properties of the respective base component that are modifiable by the user for the templated component, wherein a remaining subset of modifiable properties of the respective base component are encapsulated for the templated component.

Optionally, each component template is one of a document descriptor and an object descriptor, wherein each templated component is one of:

a templated object defined by the respective object descriptor which specifies one or more property modifications of a respective base object; and a templated document defined by the respective document descriptor which specifies at least one of:

one or more property modifications of a respective base document; and one or more property modifications of a templated object associated with the templated document.

In one embodiment, the form template includes one or more style sheets, wherein each style sheet defines one or more property modifications to be applied by the server processing system to groups of components, when generating the electronic form, based on a component type defined by the style sheet.

In another embodiment, the server processing system applies a prioritised implementation of property modifications when generating the electronic form in instances where one or more property modifications conflict, wherein the document descriptor has a higher priority than the object descriptors, and the document descriptor and the object descriptors have a higher priority than the style sheet.

In another broad aspect there is provided a client processing system for use in generating an electronic form, wherein the client processing system is in communication with a server processing system as part of a distributed system, wherein the client processing system is configured to:

transfer, to the server processing system, selection data indicative of a selected form template including one or more component templates;

receive, from the server processing system, environment data indicative of a form composition environment including a plurality of components available for composing a form, wherein the plurality of components available includes at least one templated component being a modification of a base component defined by one of the component templates;

generate form composition data indicative of a user composing, within the form composition environment, a form composition using at least one of the templated components;

transfer the form composition data to the server processing system for generating the electronic form;

receive, from the server processing system, the generated electronic form.

In one embodiment, the form composition data includes a form definition file, wherein the client processing system is configured to insert a reference to a component template in the form definition file in the event that a templated component is used in the form composition.

In another embodiment, each component template defines one or more property modifications to the respective base component, wherein the client processing system presents each component template in the form composition environment in accordance with the one or more modifications.

Optionally, the client processing system is configured to present a subset of modifiable properties of a base component for a templated component in the form composition environment according to the respective component template, wherein a remaining subset of modifiable properties of the respective base component are encapsulated for the templated component.

In another broad aspect there is provided a computerized system for generating an electronic form, the computerized system being configured to:

obtain selection data indicative of a selected form template including one or more component templates;

present a form composition environment including a plurality of components available for composing a form, wherein the plurality of components available includes at least one templated component being a modification of a base component defined by one of the component templates;

generate form composition data indicative of a user composing, within the form composition environment, a form composition using at least one of the templated components; and generate the electronic form based upon the form composition data.

In one embodiment, the form composition data includes a form definition file including one or more references to at least one of the component templates indicating that one or more respective templated components are included in the form composition, wherein the computerized system is configured to:

use each reference in the form definition file to obtain the respective component template;

determine, using the respective component template, the respective base component associated therewith; and generating, the electronic form using the form definition file, the respective base component and the respective component template.

In another embodiment, each component template defines one or more property modifications to the respective base component, wherein the computerized system applies the one or more modifications to the respective base component when generating the electronic form.

In an optional embodiment, the one or more property modifications define a subset of modifiable properties of the respective base component that are modifiable by the user for the templated component, wherein a remaining subset of modifiable properties of the respective base component are encapsulated for the templated component.

In another optional embodiment, each component template is one of a document descriptor and an object descriptor, wherein each templated component is one of:

a templated object defined by the respective object descriptor which specifies one or more property modifications of a respective base object; and a templated document defined by the respective document descriptor which specifies at least one of:

one or more property modifications of a respective base document; and one or more property modifications of a templated object associated with the templated document.

Optionally, the form template includes one or more style sheets, wherein each style sheet defines one or more property modifications to be applied by the computerized system to groups of components, when generating the electronic form, based on a component type defined by the style sheet.

In one embodiment, the computerized system is a distributed system including a server processing system in communication with a client processing system.

In another embodiment, the server processing system of the computerized system is configured to:

receive, from the client processing system, the selection data indicative of the selected form template;

transfer, to the client processing system, the environment data indicative of the form composition environment;

receive, from the client processing system, the form composition data indicative of the user composing, within the form composition environment, the form composition using at least one of the templated components;

generate the electronic form based upon the form composition data; and transfer, to the client processing system, the generated electronic form.

In another embodiment, the client processing system of the computerized system is configured to:

transfer, to the server processing system, the selection data indicative of the selected form template;

receive, from the server processing system, the environment data indicative of the form composition environment;

generate form composition data indicative of a user composing, within the form composition environment, the form composition using at least one of the templated components;

transfer the form composition data to the server processing system for generating the electronic form;

receive, from the server processing system, the generated electronic form

In another broad aspect there is provided a computer program product including one or more programs for execution by one or more processors of a server processing system, wherein the server processing system is in communication with a client processing system as part of a distributed system, wherein execution of the one or more programs configures the server processing system to:

receive, from the client processing system, selection data indicative of a selected form template including one or more component templates;

transfer, to the client processing system, environment data indicative of a form composition environment including a plurality of components available for composing a form, wherein the plurality of components available includes at least one templated component being a modification of a base component defined by one of the component templates;

receive, from the client processing system, form composition data indicative of a user composing, within the form composition environment, a form composition using at least one of the templated components;

generate the electronic form based upon the form composition data; and transfer, to the client processing system, the generated electronic form.

In another broad aspect there is provided a computer program product including one or more programs for execution by one or more processors of a client processing system, wherein the client processing system is in communication with a server processing system as part of a distributed system, wherein execution of the one or more programs configures the client processing system to:

transfer, to the server processing system, selection data indicative of a selected form template including one or more component templates;

receive, from the server processing system, environment data indicative of a form composition environment including a plurality of components available for composing a form, wherein the plurality of components available includes at least one templated component being a modification of a base component defined by one of the component templates;

generate form composition data indicative of a user composing, within the form composition environment, a form composition using at least one of the templated components;

transfer the form composition data to the server processing system for generating the electronic form;

receive, from the server processing system, the generated electronic form.

In another broad aspect there is provided a computer program product including one or more programs for execution by one or more processors of a computerized system, wherein execution of the one or more programs configures the computerized system to:

obtain selection data indicative of a selected form template including one or more component templates;

present a form composition environment including a plurality of components available for composing a form, wherein the plurality of components available includes at least one templated component being a modification of a base component defined by one of the component templates;

generate form composition data indicative of a user composing, within the form composition environment, a form composition using at least one of the templated components; and generate the electronic form based upon the form composition data.

In another broad aspect there is provided a method for generating an electronic form, the method including, in a computerized system, steps of: obtaining selection data indicative of a selected form template including one or more component templates;

presenting a form composition environment including a plurality of components available for composing a form, wherein the plurality of components available includes at least one templated component being a modification of a base component defined by one of the component templates;

generating form composition data indicative of a user composing, within the form composition environment, a form composition using at least one of the templated components; and generating the electronic form based upon the form composition data.

In another broad aspect there is provided a method for generating an electronic form using a distributed system, the distributed system including a server processing system in communication with a client processing system, wherein the method includes, in the server processing system, steps of receiving, from the client processing system, selection data indicative of a selected form template including one or more component templates;

transferring, to the client processing system, environment data indicative of a form composition environment including a plurality of components available for composing a form, wherein the plurality of components available includes at least one templated component being a modification of a base component defined by one of the component templates;

receiving, from the client processing system, form composition data indicative of a user composing, within the form composition environment, a form composition using at least one of the templated components;

generating the electronic form based upon the form composition data and transferring, to the client processing system, the generated electronic form.

In another broad aspect there is provided a method for generating an electronic form using a distributed system, the distributed system including a server processing system in communication with a client processing system, wherein the method includes, in the client processing system, steps of:

transferring, to the server processing system, selection data indicative of a selected form template including one or more component templates;

receiving, from the server processing system, environment data indicative of a form composition environment including a plurality of components available for composing a form, wherein the plurality of components available includes at least one templated component being a modification of a base component defined by one of the component templates;

generating form composition data indicative of a user composing, within the form composition environment, a form composition using at least one of the templated components;

transferring the form composition data to the server processing system for generating the electronic form;

receiving, from the server processing system, the generated electronic form.

Other embodiments will be described throughout the description of the example embodiments.

BRIEF DESCRIPTION OF THE FIGURES

Example embodiments should become apparent from the following description, which is given by way of example only, of at least one preferred but non-limiting embodiment, described in connection with the accompanying figures.

DESCRIPTION OF EMBODIMENTS

Figure 1:
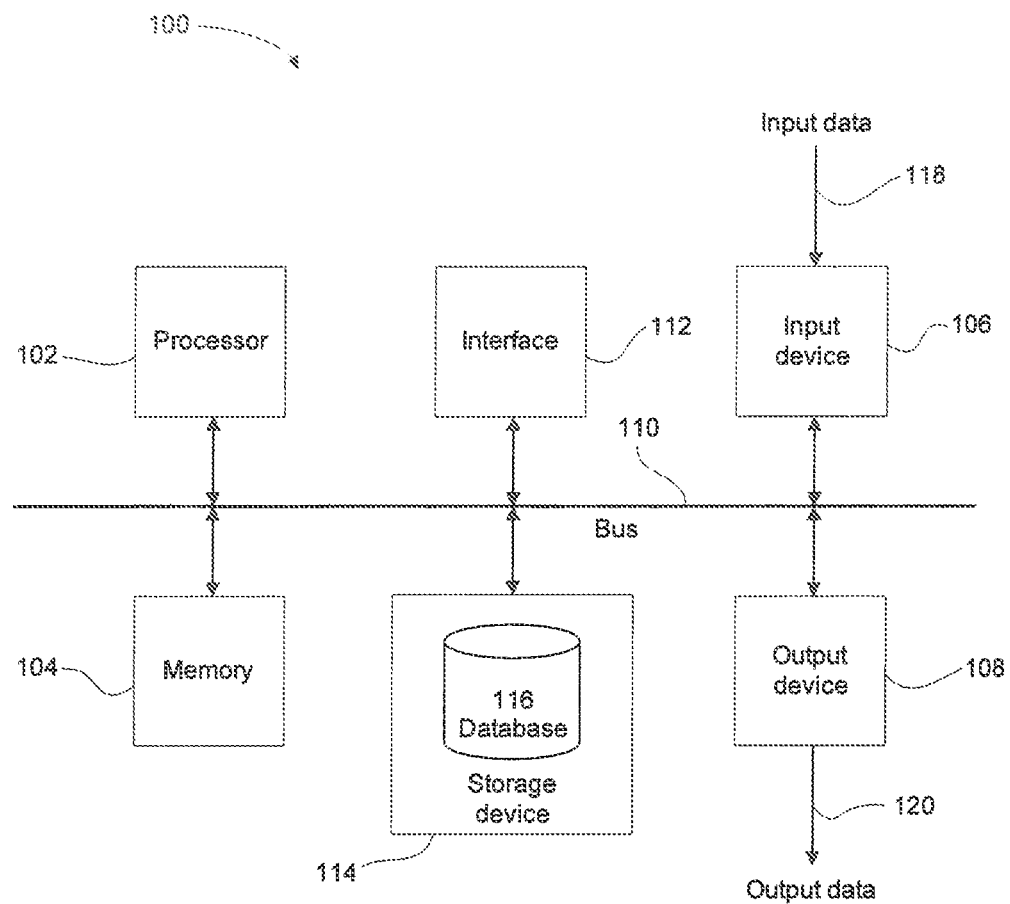
FIG. 1 illustrates a functional block diagram of an example processing system that can be utilised to embody or give effect to a particular embodiment.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

A particular embodiment can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 also can be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116 and/or the memory 104. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

Figure 2:
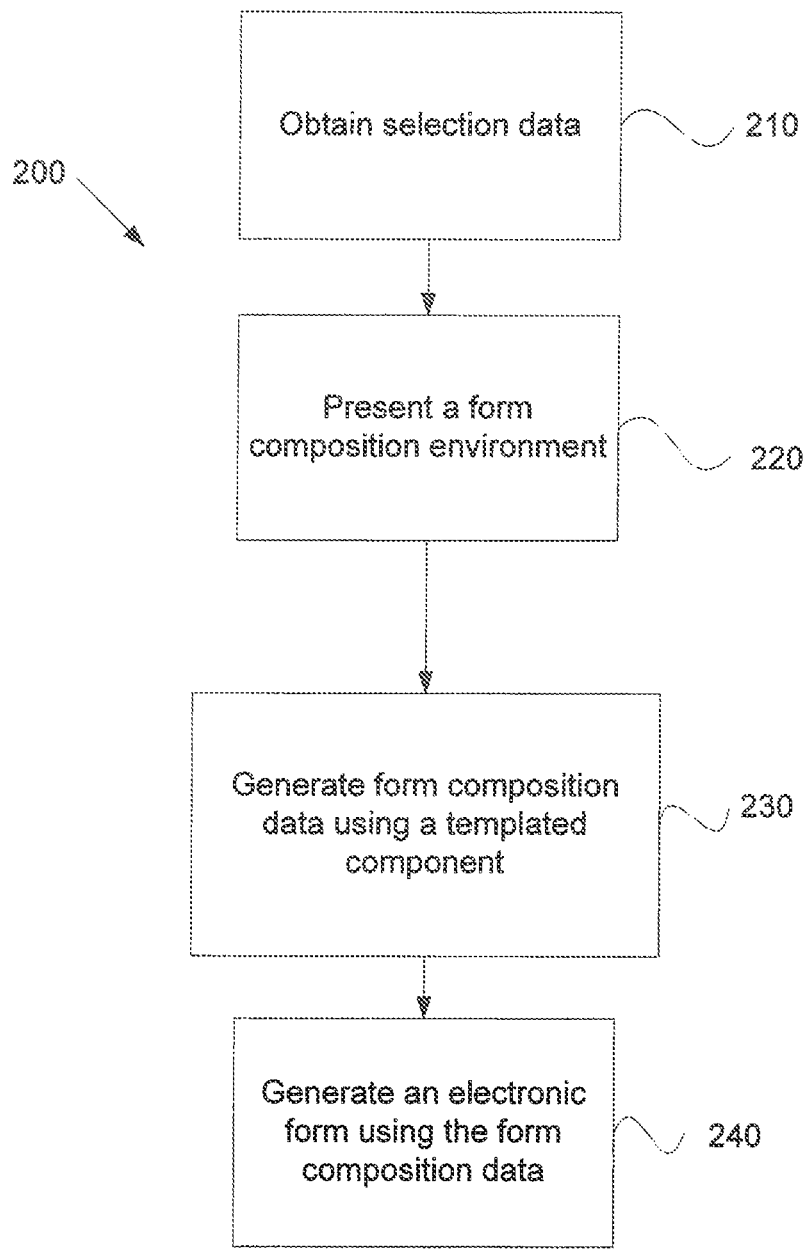
FIG. 2 illustrates a flow diagram representing an example of a method for generating electronic forms.

Referring to FIG. 2 there is shown a flow chart representing a method 200 for generating electronic forms. The method 200 can be performed by a computerized system including one or more processing systems 100.

In particular, at step 210 the method 200 includes obtaining selection data indicative of a selected form template, wherein each template includes one or more templates form components. At step 220, the method 200 includes presenting a form composition environment including the one or more templated components which modify a respective one or more a base form components. At step 230, the method 200 includes generating form composition data indicative of a user composing, within the form composition environment, a form composition using the one or more templated components. At step 240, the method 200 includes generating the electronic form based upon the form composition data.

It will be appreciated that a computerized system, and a computer program product for configuring a computerized system, can be provided for generating an electronic form in accordance with method 200.

The computer program product may be provided as a computer readable medium. The term "computer readable medium" as used herein refers to any storage or transmission medium that participates in providing instructions and/or data to the processing system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the processing system 100. Examples of transmission media include radio or infra-red transmission channels as well as a network connection to another computer or networked device, and the Internet or Intranets including e-mail transmissions and information recorded on websites and the like.

Due to the utilisation of the form template, technical aspects of designing the form can be separated from the business-related aspects of composing the form. This is achieved by allowing a template designer user, such as a software engineer or the like, to create the form template that encapsulates styles, guidelines and rules for an organisation's forms. A business-oriented subject-matter-expert can then select the form template such that the templated component(s) presented as being available for composition within the form composition environment extends or modifies a base component according to the form template. In this manner, the form template can preset properties and functions of the templated component such that the generated electronic form conforms to set criteria.

The form template can also include a pre-composed form which is used by a user during composition to compose a form. It will be appreciated that the pre-composed form may include some formatting including a header and/or footer.

Figure 3A:
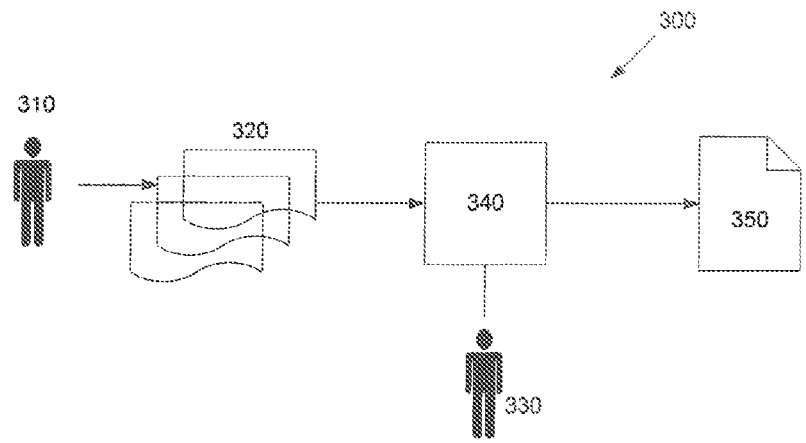
FIG. 3A illustrates a block diagram representing an example system for generating an electronic form.

Referring to FIG. 3A, there is shown a high level schematic of the system for generating an electronic form.

In particular, the system 300 includes a template designer 310 who generates the form template 320. The form template 320 can predefine the look and behaviour of one or more templated components used for composing the form by specifying a vast majority of the component's properties within the form template 320. The form template 320 generated by the template designer 310 also modifies the presentation of one or more base components presented within the form composition environment 340, thereby promoting the standardised composition of the form. Effectively, the form template 320 encapsulates, as far as possible, consistent style and functionality of a generated electronic form.

The system 300 also includes a form composer user 330 who is able to select one of the form templates 320 from a plurality of form templates. The form template 320 can be interpreted by the form composition environment 340 upon selection, wherein templated components available for inclusion in a form composition are presented within the form composition environment 340. One of more templated components can then be selected to compose the form. The form composer can then instruct a form generator to generate the electronic form 350 based on the form composition including the one or more templated components.

The form template 320 selected can define a subset of properties of the base component which are presented to the form composer user 330 within the form composition environment 340 as the templated component. This functionality allows the designer 310 to limit the number of properties that the form composer user 330 is able to set in order to force the generated electronic form 350 to follow a standardised style and functionality. The vast majority of style and functionality settings can be set within the form template.

Figure 3B:
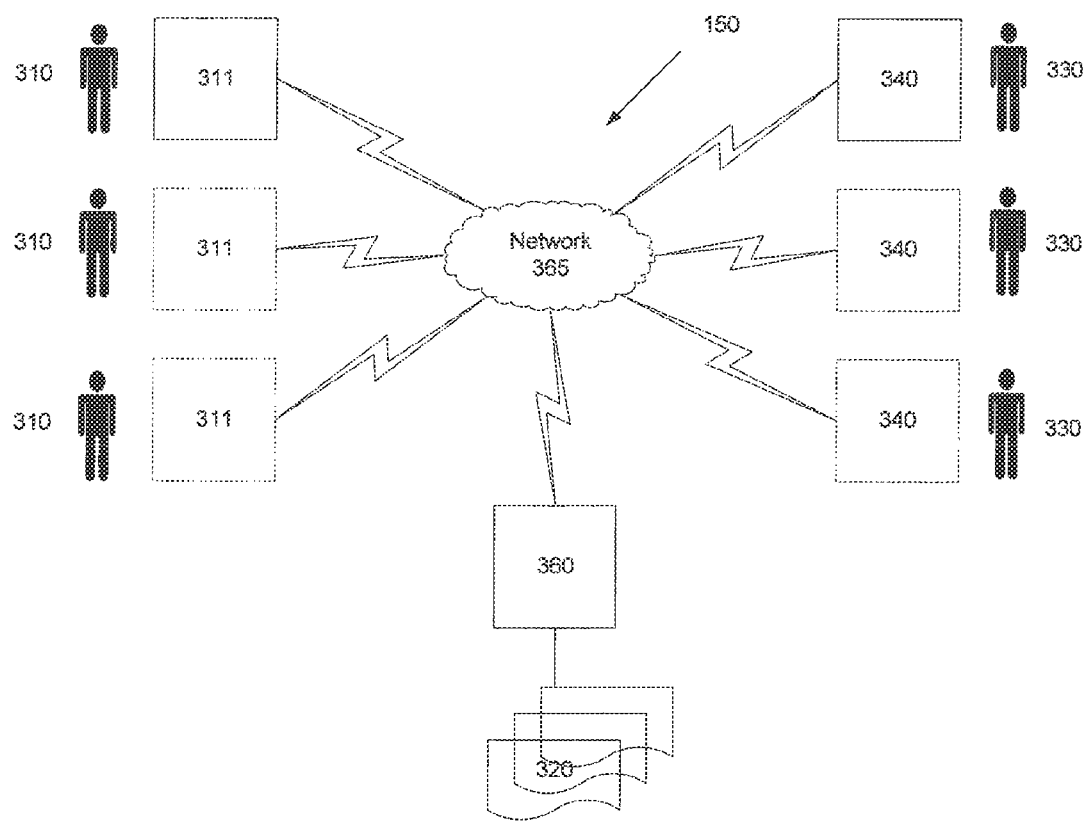
FIG. 3B illustrates a block diagram representing an example distributed system for generating an electronic form.

Referring to FIG. 3B, there is shown a block diagram illustrating an example of a distributed system 150 for generating an electronic form. In particular, the distributed system 150 includes at least one server processing system 360 which is in data communication, via a network 365, with at least one client processing system 340 which is operated by a form composer user 330. The server processing system 360 can be a processing system 100. The server processing system 360 stores one or more form templates 320. In this distributed system 150, the form composing user is able to transfer form composition instructions to the server processing system 360, via the network 365, such that the electronic form 350 is generated by the server 360 and eventually transferred to the client processing system 340.

As shown in FIG. 3A, the server processing system 360 may also be in data communication, via the network 365, with one or more template designer processing systems 311 operated by the template designer 310. The template designer 310 is able to generate one or more form templates 320 using the template designer processing system 311, wherein the one or more form templates 320 are transferred to the server processing system 360 for storage therein, such that the form composing user 330 is able to select a form template 320 from a plurality of form templates 320 at a central processing system location. It will be appreciated that the one or more template designer processing systems 311 are optional, wherein the template designer user 310 may generate and/or store the one or more form templates 320 directly at the server processing system 360.

Figure 3C:
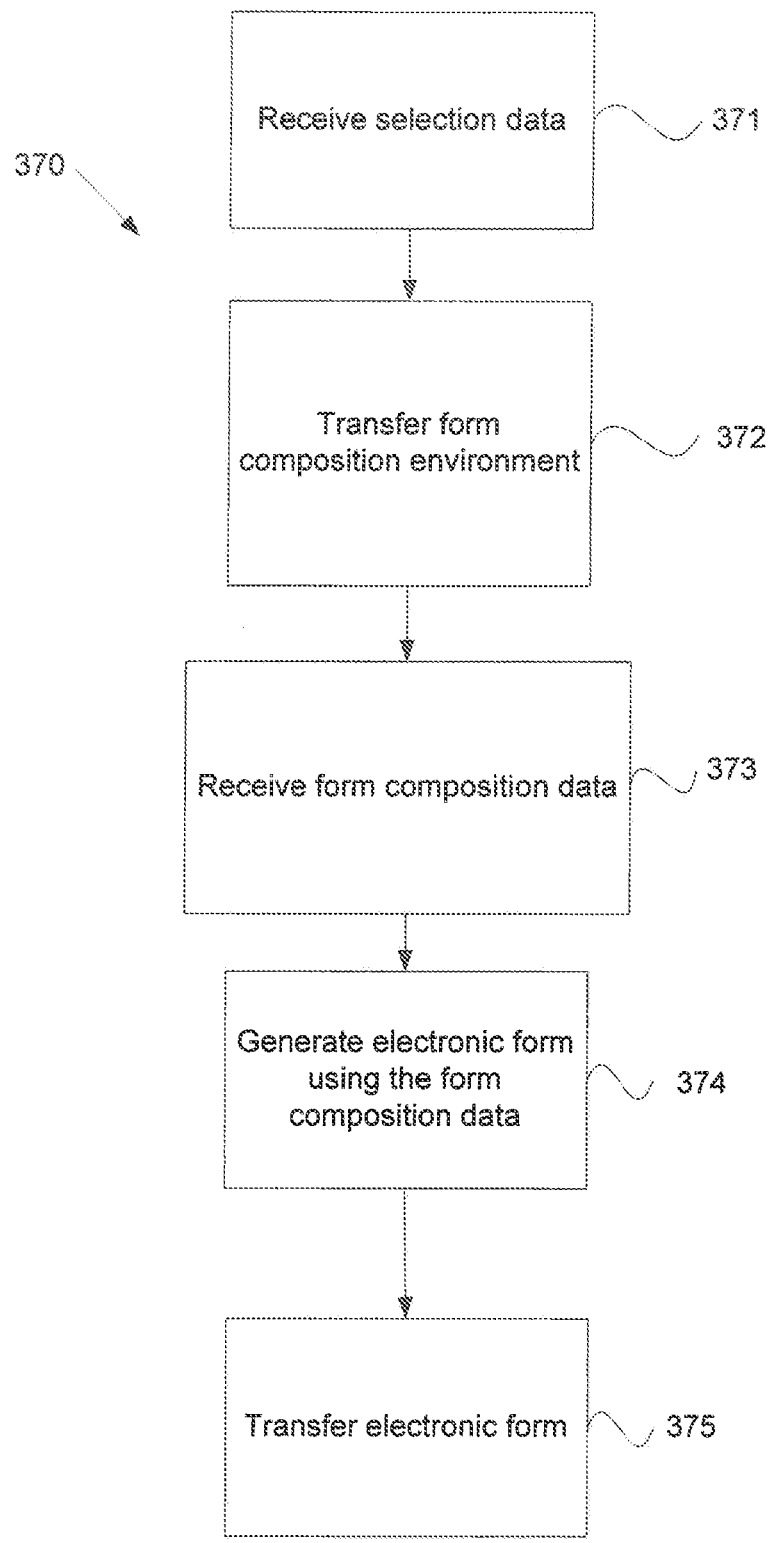
FIG. 3C illustrates a flow diagram representing an example of a method performed by a server processing system in a distributed system for generating an electronic form.

Referring to FIG. 3C, there is shown a flow chart representing an example method performed by the server processing system of the distributed system 150. In particular, at step 371, the method 370 includes receiving, from the client processing system 340, selection data indicative of a selected form template including one or more component templates. At step 372, the method 370 includes transferring, to the client processing system 340, environment data indicative of a form composition environment including a plurality of components available for composing a form. The plurality of components available includes at least one templated component, wherein each templated component being a modification of a base component, and wherein the modification being defined by one of the component templates. At step 373, the method 370 includes receiving, from the client processing system 340, form composition data indicative of a user composing, within the form composition environment, a form composition using at least one of the templated components. At step 374, the method 370 includes generating the electronic form based upon the form composition data. At step 375, the method 370 includes transferring, to the client processing system 340, the generated electronic form.

As will be appreciated from FIG. 3C, the server processing system 360, and a computer program product to configure the server processing system 360, can be provided to perform the method 370.

Figure 3D:
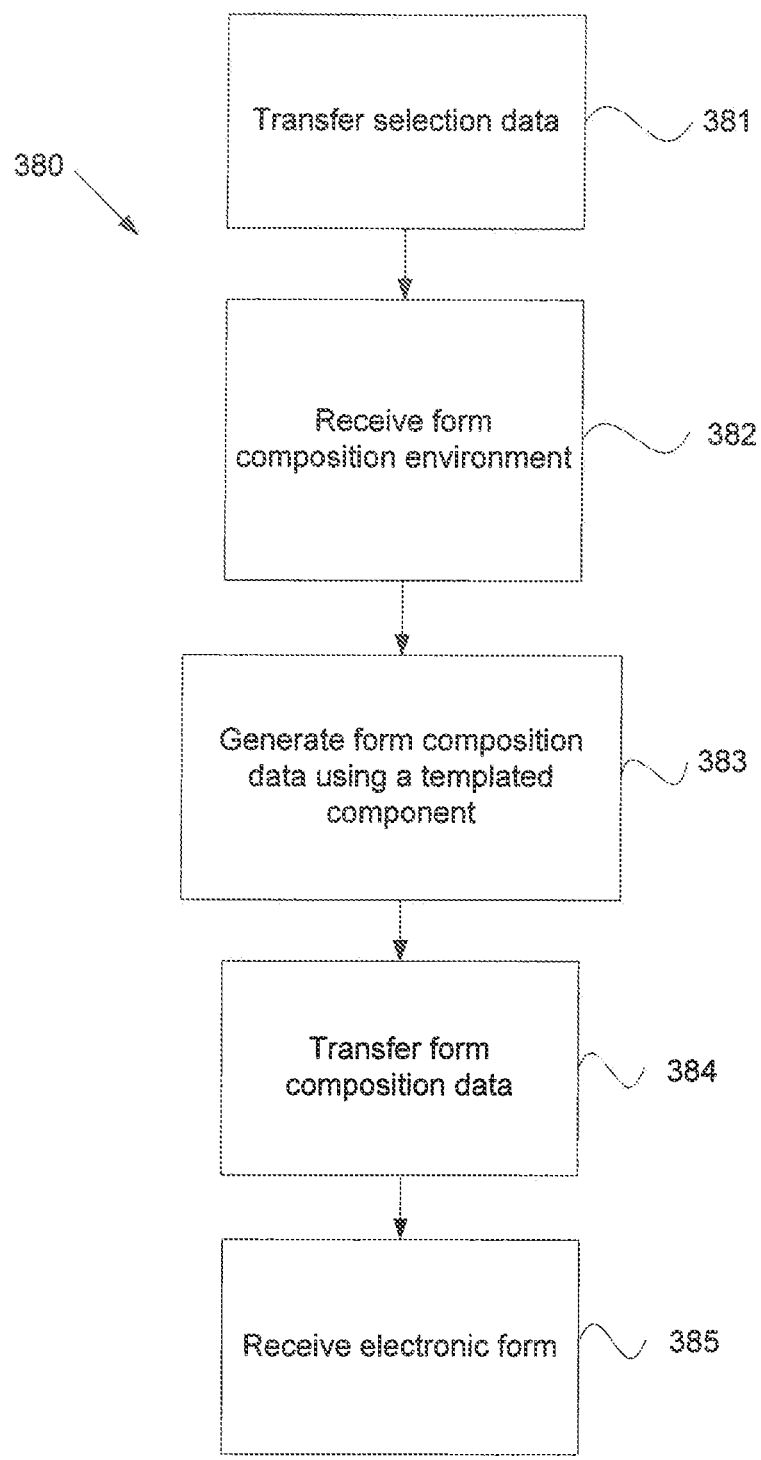
FIG. 3D illustrates a flow diagram representing an example of a method performed by a client processing system in a distributed system for generating an electronic form.

Referring to FIG. 3D, there is shown a flow chart representing an example method performed by the client processing system 340 in the distributed system 150. In particular, at step 381 the method 380 includes transferring, to the server processing system 360, selection data indicative of a selected form template including one or more component templates. At step 382 the method 380 includes receiving, from the server processing system 360, environment data indicative of a form composition environment including a plurality of components available for composing a form. The plurality of components available includes at least one templated component, wherein each templated component is a modification of a base component, and wherein the modification is defined by one of the component templates. At step 383 the method 380 includes generating form composition data indicative of a user composing, within the form composition environment, a form composition using at least one of the templated components. At step 384 the method 380 includes transferring the form composition data to the server processing system 360 for generating the electronic form. At step 385 the method 380 includes receiving, from the server processing system 360, the generated electronic form.

As will be appreciated from FIG. 3D, the client processing system 340 for the distributed system 150, and a computer program product to configure the client processing system 340, can be provided to perform the method 380.

Figure 3E:
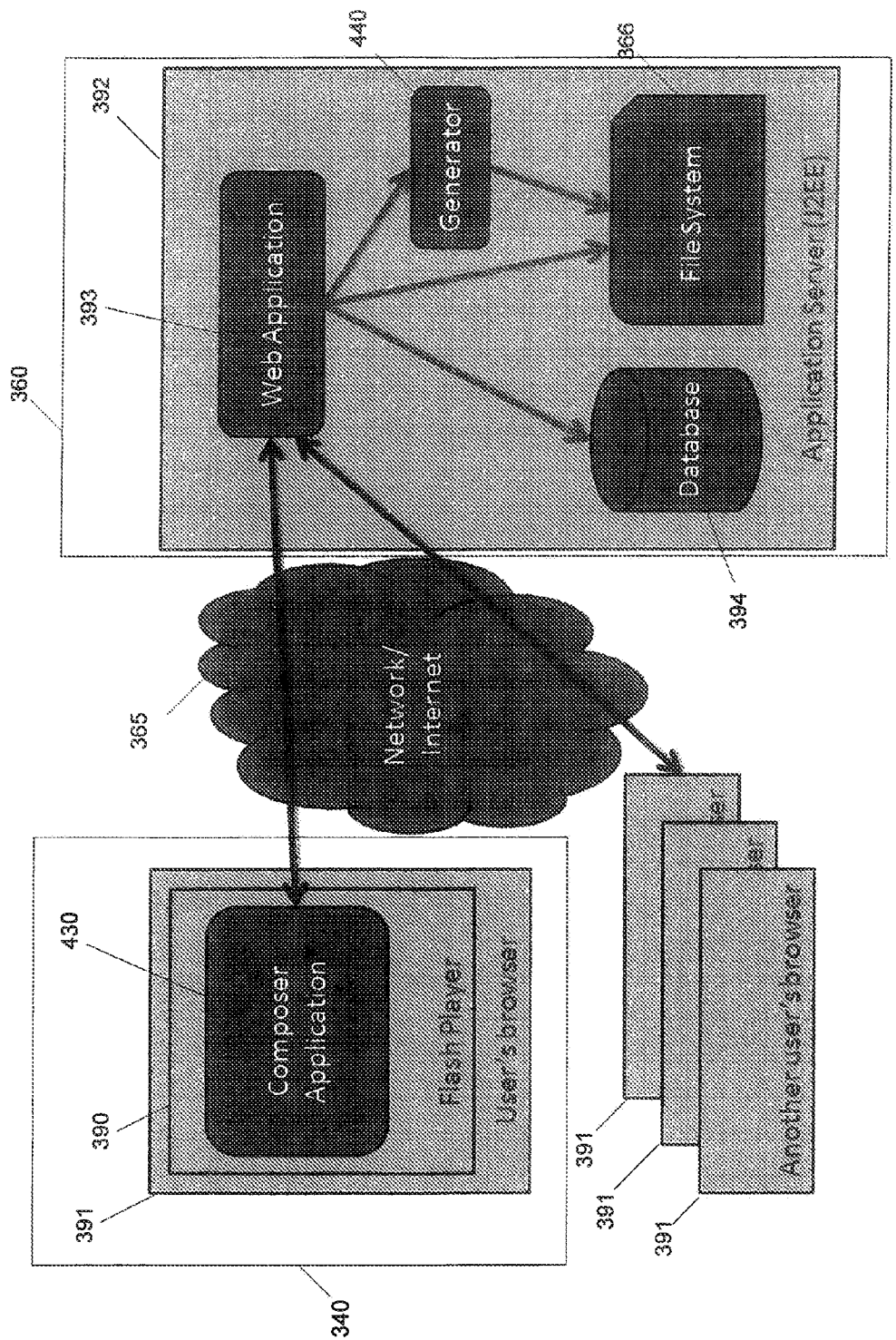
FIG. 3E illustrates a block diagram representing a more detailed example distributed system for generating an electronic form.

Referring to FIG. 3E there is shown a more detailed block diagram representing the generation of an electronic form 350 using the distributed system 150. The server processing system 360 includes an application server 392, such as a J2EE (Java 2 Enterprise, Edition) application server, however it will be appreciated that other types of application servers may be used. The application server 392 includes a web application 393 which is in data communication with a form generator 440, a database 394, and a file storage system 366 which is in turn in data communication with the form generator 440. The database 394 may be provided as a relational database such as Oracle or SQLServer, however other types of relational databases may be used. The database 394 stores therein records indicative of users, organisations, projects and form definition files. The file storage system 366 stores data indicative of the one or more form templates 320. As will be discussed in more detail, the form generator uses the form composition data and the selected form template 320 to generate the electronic form 350.

The client processing system 340 includes a web browser in order to access the web application 393 via the network 365 such as the Internet. The web application 393 can be displayed via the web browser as a flash program to present a form composer application to the form composer user 310. The flash program 393 can be built as an Adobe Flex application. It will be appreciated that web browser may display the form composer application in other formats. As illustrated in the block diagram of FIG. 3E, other form composer users 310 may be in data communication via respective web browsers 391 with the server processing system 360. The form composer application can present a graphical interface allowing the form composer user 310 to be presented with a graphical representation of at least some of the data stored in the database 394 and the file storage system 366.

The data communication between the client processing system(s) 340 and the server processing system 360 is performed using a number of protocols. In particular, data can be transferred using Adobe AMF protocol and HTTP/HTTPS. Data which is transferred can include object data, other data, and Adobe flash object data. The object data is generally implemented as Java objects on the server, and equivalent Flash objects on the client. Objects are usually transferred using the AMF protocol. The other data can be indicative of images, CSS style sheets, simple HTTP POST requests, and other similar binary and textual data which is usually transferred over the HTTP or HTTPS protocols. The Adobe flash object can be indicative of wireframe representations of particular field types for the form. The wireframe representation provides an advantageous user experience for the form composer user 310. The Adobe flash object data can be transferred as Adobe flash files. It will be appreciated that the transfer of data described above is a preferred embodiment and that other types of formats and protocols can be used.

Figure 4:
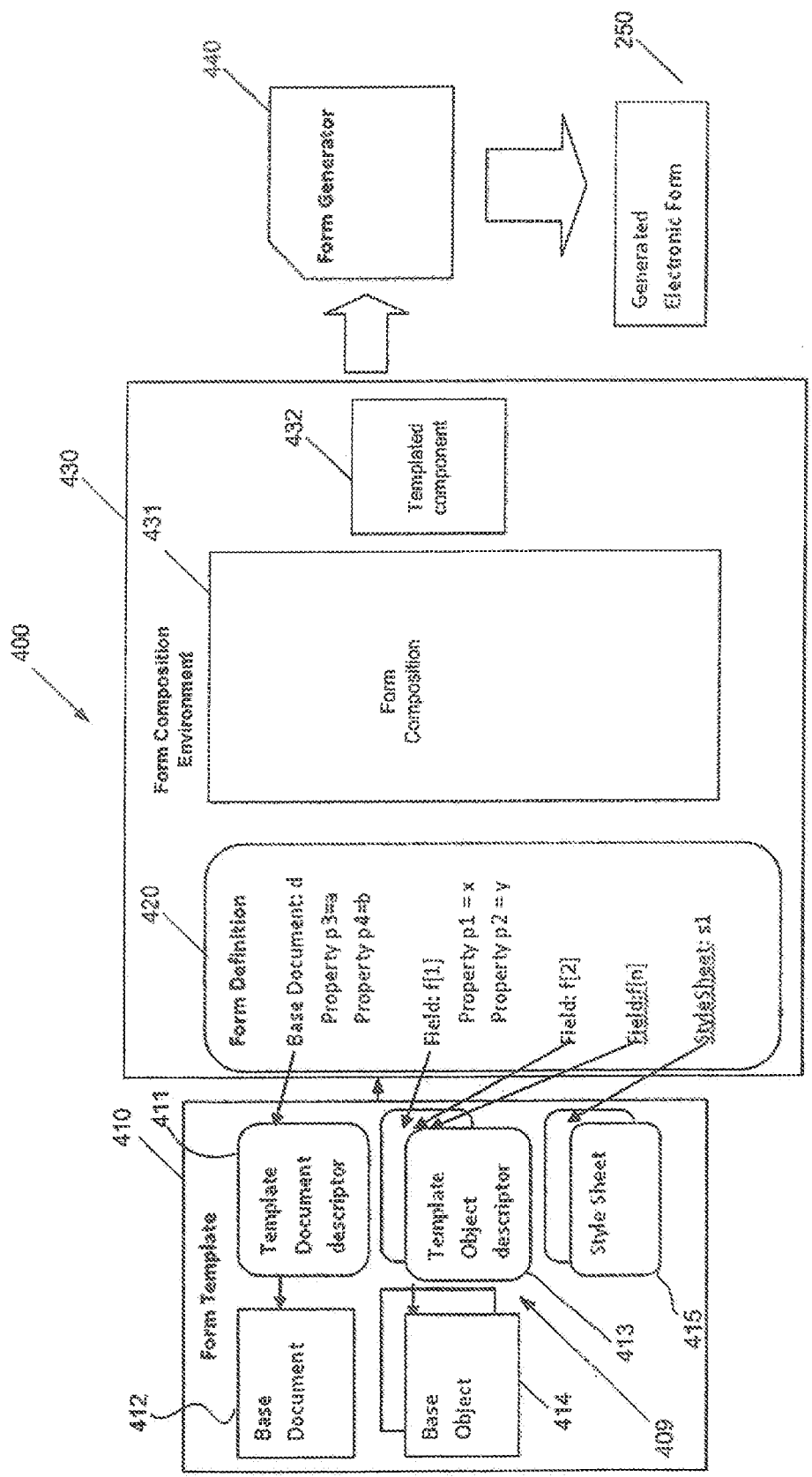
FIG. 4 illustrates a block diagram representing an example of the generation of electronic forms.

Referring to FIG. 4 there is shown a block diagram representing the generation of an electronic form.

In particular, the electronic form 350 is generated based upon a form definition file 420. The form definition file 420 can be provided in the form of an XML file. The form definition file 420 includes references to the form template including one or more component templates 409. The component templates can be provided as a template document descriptor 411, one or more template object descriptors 413, and one or more style sheets 415. Generally, the form definition file 420 is generated and/or amended to an existing form definition file 420 whilst the form composing user 310 is composing the form.

The template document descriptor 411 and one or more template object descriptors 413 are templated components and can be provided as XML files which reference a base document 412 and one or more base objects 414 respectively.

The base document 412 controls the overall look and feel of the form, page sizes, fonts, background colours, headers, footers and similar attributes, and a number of field objects. The base document 412 can be provided as an XFA snippet containing the definition of a prototypical form. The base document 412 can be a template form built using Adobe LiveCycle Designer. The base document 412 may contain master pages, default layouts, headings, footers, code libraries and other objects that determine how the overall form looks and operates.

Each base object 414 can be provided as an XFA snippet containing one or more prototypical form objects. The base object 414 can be a re-usable object or fragment built using Adobe LiveCycle Designer. A base object 414 may be a composite object consisting of multiple objects, or a container object inside of which other objects can be placed. Raw properties of the base object 414 are generally expressed as either an XML attribute or sub-element within the base object 414.

The template document descriptor 411 and the one or more template object descriptors 413 reference the respective base document 412 and one or more base objects 414 in order to modify or extend the base document 412 and the one or more base objects 414 in accordance with definitions specified within the respective descriptors 411, 413 such the form composition environment 430 presents one or more templated components 432 for inclusion in the form composition 431 which are modified according to the respective descriptor 411, 413.

The template document descriptor 411 includes definitions to specify additional information for applying to the base document 414 and set particular property values for the base document 414. Each template object descriptor 413 can also include definitions to specify additional information regarding the respective base object 414 and is able to set particular property values for the respective base object 414.

Each template descriptor 411, 413 is able to provide descriptive text, images and/or other meta-data within the form composition environment that provide explanative information about the templated component 432 that may be useful to the form composer user. The template object descriptor 413 can additionally or alternatively identify sub-objects within a parent object in the instance where the respective object is a composite of objects. This functionality allows for properties of sub-objects to be exposed within a property set for the parent object.

The template document descriptor 411 and the template object descriptors 413 include definitions which specify pre-set values for properties which are applied to and over-ride raw properties for the base document 412 and the base object 414. This functionality reduces the need for multiple sets, or a large number, of properties being set by the form composer user for each object included in the form.

The template document descriptor 411 and the template object descriptors 413 include definitions which specify a subset of properties of the respective base document 412 or the respective base object 414 which are able to be presented within the form composition environment 430. Thus, the descriptors 411, 413 hide particular properties being presented (i.e. encapsulated) within the form composition environment 430 for the templated component 432 compared to the base document 412 and base object 414 when presented within the form composition environment 430.

The template document descriptor 411 and the template object descriptors 413 can also include definitions to map one or more properties of a base object 414. For example, a raw property of a base object 414 may be "presence" which can be set to "visible" or hidden". In this instance, one of the template descriptors 411, 413 can include a definition to alter the raw property presented within the form composition environment 430 such that the form composition environment 430 may present a mapped property of "visible" having a "true" or "false" option. This functionality allows for descriptions of properties to be altered such that more intuitive descriptions and available property options are presented within the form composition environment 430.

As the descriptor 411, 413 reference the base document 412 or base object 414, form wide changes can be easily made by modifying the declarations in one or more of the descriptors 411, 413 such that an electronic form can be regenerated using the one or more modified descriptors 411, 413. This avoids problems associated with either replacing objects within the form composition or altering the one or more properties for each object individually which is a time consuming task.

Each style sheet 415 specifies default property values for an object type within the form. For example, the font for all objects may be set, within the style sheet 415, to "Arial". Alternatively, the font for all text-boxes may be set, within the style sheet 415, to "Times New Roman". As can be appreciated from these examples, the style sheet 415 defines a set of properties values for particular object types or groups of objects sharing similar characteristics. This functionality thereby avoids the need to set a property for each particular object of a particular object type as the style sheet 415 can set a property for each object satisfying an object type in a central location. It is possible that multiple style sheets 415 are referenced within the form definition file 420, wherein each style sheet 415 sets properties for an object type in an order which they are referenced within the form definition file 420. For example, the form definition file 420 may include a first reference to a first style sheet 415 which sets a font of Ariel for all objects. The form definition file 420 may include a second reference to a second style sheet 415 which overrides this setting for particular object types, wherein the second style sheet 415 specifies that headings are set to use a Verdana font.

The form composition environment 430 is used by the form designer 330 to compose the form composition using the form template 420. In particular, the form composition environment 430 can be provided in the form of a software application which includes a graphical user interface which allows a user to select a template form 420 from a plurality of template forms 420 for use in composing and generating an electronic form. The form composition environment 430 loads the selected form template 420 wherein a graphical user interface is displayed to the user wherein the base document 412 and base object 414 are modified in accordance with the template document descriptor 411, one or more template object descriptors 413, and/or one or more style sheets 415.

The form composition environment 430 can present a graphical representation of the form a graphical representation of the templated components 432 available in accordance with the form template 410. An object window can be presented within the form composition environment 430 allowing a user to select a templated component 432 for inclusion in the form composition 431. A base object 414 which has been referenced within one of the template object descriptors 413 can be overridden by the loading of the form template 410 by the form composition environment 430. The properties of the templated component 432 are pre-set by the template object descriptor 413.

Additionally, only a subset of properties of the base object 414 may be presented within the form composition environment 430 for the templated component 432 in order to minimise the options to the form composer user 330 such that the generated form 350 conforms to set standards defined within the form template 410. The user is able to select, using an input device of the processing system 100, one of the templated components 432 presented within the object window of the form composition environment 430 for inclusion in the form composition 431.

The value of properties may be defined at various different levels. Firstly, a raw property can be defined within the base object 414 or base document 412. For example, a text field may have a "presence" property set to "visible". In another instance, a property can be defined within the template descriptor 411, 413, that being either the template document descriptor 411 or the template object descriptor 413. In another instance, a property can be defined within the style sheet 415, wherein the style sheet 415 can specify the value of a property of an object type. In another form, a property can be defined in the form definition file 420.

As will be appreciated in relation to the function performed by the form definition file 420, the template document descriptor 411, the template object descriptor 413, and the style sheet 415, each of these components can be utilised to set a particular property. It will be appreciated that as these different components can set properties of templated components 432 of the form, particular properties which are set by one part of the form template 410 may contradict a property set by another part of the form template 410. In this regard, the form composition environment 430 applies a precedence or priority to these parts of the form template 410 to resolve conflicting set properties. In this regard, properties set within the base object or base document 412, 414 take least precedence, followed by the template descriptors 411, 413, the style sheet 415, and finally the form descriptor file 420. It is intended that a relatively small number of properties are to be defined within the form descriptor file 420 as most properties are to be controlled via the descriptors 411, 413 or style sheets 415.

As the form composer user 330 composes the form within the form composition environment 430, modifications made to the form composition 431, such as setting particular properties of the form, can be stored within the processing system 100 as form composition data, wherein these modification can be stored within one or more of the form definition file 420, the template document descriptor 411, the template object descriptor 413, and the style sheet 415.

Referring to FIG. 4, once the form composition 431 has been composed within the form composition environment 430, the form composer user 330 is able to instruct the processing system 100 to generate the electronic form 350. The generation of the electronic form 350 is performed by the form generator 440. The form composer user 330 can instruct the form generator 440 to generate the electronic form 350 via the form composition environment 431.

The form generator 440, when instructed, obtains form composition data indicative of the form definition file 420, any referenced template document descriptors 411, any referenced template object descriptors 413, the associated base document 412 and base objects 414 referenced within the respective template descriptors 411, 413, and any style sheets 415. The form generator 440 then generates a completed XFA form based upon the form composition data. The form generator 440 can also apply layout rules, such as a layout manager to ensure that the generated electronic form 350 is laid out as required by the form composition data, and may also add custom code to assist with the behaviour of the generated electronic form 350.

Figure 5:
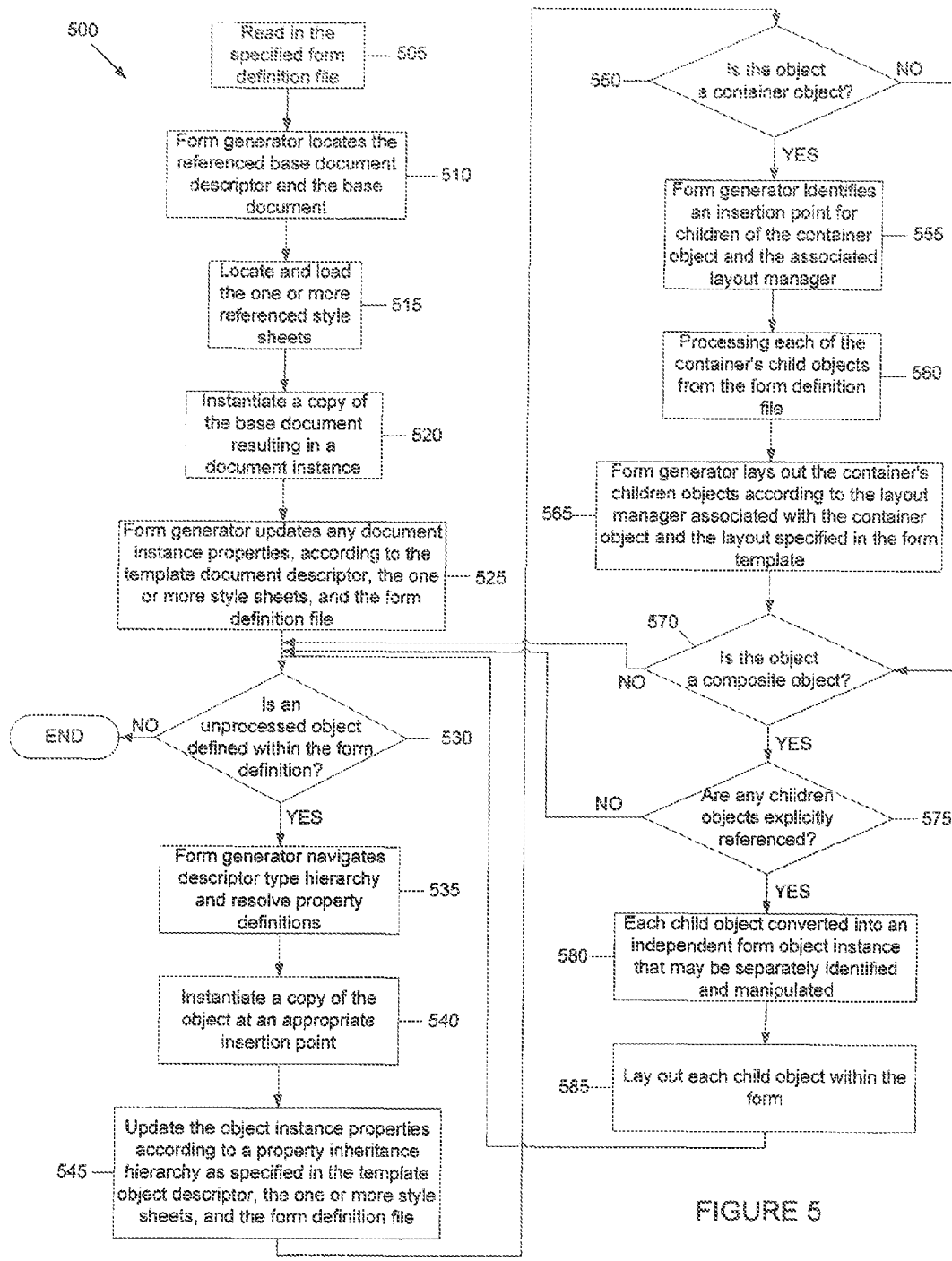
FIG. 5 illustrates a flow chart representing a method performed by the form generator for generating an electronic form.

Referring to FIG. 5 there is shown a method performed by the form generator 440 for generating the form composed within the form composition environment 430.

In particular, at step 505, the method includes the form generator 440 reading in the specified form definition file 420. At step 510, the method includes the form generator 440 locating the referenced base document descriptor 411 and the base document 412. At step 515, the method includes locating and loading the one or more referenced style sheets 415. At step 520, the method includes instantiating a copy of the base document 412 resulting in a document instance.

At step 525, the method includes the form generator 440 updating any document instance properties, according to the template document descriptor 411, the one or more style sheets 415, and the form definition file 420. The form generator 440 can apply the properties according to an inheritance hierarchy. At step 530, the method includes determining if any unprocessed object definitions 413 are defined within the form definition 420. If a successful determination has occurred, the method proceeds to step 535, wherein the method includes the form generator navigating a descriptor type hierarchy and resolve property definitions. In the event of an unsuccessful determination, the method ends due to the generation of the electronic form 350 being completed. At step 540, the method includes instantiating a copy of the base object 414 at an appropriate insertion point.

At step 545, the method includes updating the object instance properties according to a property inheritance hierarchy as specified in the template object descriptor 413, the one or more style sheets 415, and the form definition file 420 respectively. At step 550, the method includes the form generator 440 determining if the object is a container object. In the event that the object is a container object, the method proceeds to step 555. In the event that the object is not a container object, the method proceeds to step 570.

At step 555, the method includes the form generator 440 identifying an insertion point for children of the container object and the associated layout manager. At step 560, the method includes processing each of the container's child objects from the form definition file 420. At step 565, the form generator 440 lays out the container's children objects according to the layout manager associated with the container object and the layout specified in the form template.

At step 570, the method includes the form generator 440 determining whether the object is a composite object. In the event that the form generator 440 determines that the object is a composite object, the method proceeds to step 575. In the event of an unsuccessful determination, the method proceeds back to step 530. At step 575, the method includes the form generator 440 examining the respective object descriptor 413 for the object to determine whether any children objects are explicitly referenced. In the event of an unsuccessful determination, the method proceeds back to step 530. In the event that a child object is explicitly referenced, each child object is converted into an independent form object instance that may be separately identified and manipulated at step 580. At step 585, the method includes laying out each child object within the form. The method then proceeds back to step 530.

The form generator 440 performs the core activities of constructing the XFA form using the form definition file 420, the one or more template descriptors 411, 413 and the one or more style sheets 415. This functionality overcomes issues associated with a user performing this generation task in a manual manner, thereby eliminating a substantial amount of errors that can occur during the form development process. The form generator 440 can also adjust properties of particular objects during the generation process in accordance with modifications in properties such as paper size. A template property can also be examined by the form generator 440, and used to generate specific code.

As mentioned above, the form generator 440 can apply a layout style when generating the electronic form using the form composition data. In particular, the form composition user 330 can select a grid layout within the form composition environment 430, wherein the form generator 440 may define a plurality of columns such that a first object is located within a first column, a second object is located in a second column, and so on. The form generator 440 ensures that the objects in the grid layout line up correctly, and are correctly spread out across the available space of the form or sub-form. Another or alternate layout manager available for selection via the form composition environment 430 enables the form generator 440 to layout objects within a vertical column, however a group of objects within the column can be selected to be horizontally aligned. This layout manager can be useful for fields of a form which should appear beside each other. Another layout manager made available for selection with the form composition environment 430 configures the form generator 440 to automatically expand each object to have an equivalent special size of the parent object.

The form composition environment 430 can also allow the form composer user 330 to define declarative XML-based expressions for use by the form generator 440 for generating the electronic form 350. A declarative XML-based language for describing simple expressions can be used for defining simple operations such as Boolean, numeric and string manipulation within the form composition environment 430. This language has been optimised to allow a simple point-and-click user interface within the form composition environment 430 that allows a form composer user 330 to build declarative expressions without any programming knowledge. The XML language is implemented in JavaScript or another coding language so that it can run within the form. Such declarations can be used, for example, to validate an email address or a social security number within the generated form. If the declarative language interface provided within the form composition environment 430 cannot be used to generate a more complex declaration, the form composer user 330 can specify the requirements of their expression in natural language. The form generator 440 can then generate a skeleton of a JavaScript function, which can be implemented at a latest stage by a developer.

In the XFA specification, objects can reference each other using programming languages using an expression known in XFA as a SOM expression. However, SOM expressions are subject to high failure due the SOM expression being based upon the name or location of an object which is subject to change when composing the form. In order to overcome this problem, the form generator automatically generates an XFA form wherein objects register themselves, and can be looked up from code in other locations. In this instance, an object's name or location can be changed without impacting any code that references the respective object.

The XFA specification includes many events that are generated both by users and automatically during form execution. These events are complicated to understand and use, and often beyond the capabilities of a form composer user which is assigned the task of developing a form. In this regard, the form template 420 can include declarations specifying a subset of events that are applicable for particular template type, so as to reduce complexity. Thus, when the form template 420 is used to compose a form, only a subset of event are presented to the form composer user 430 during form composition. The form template 420 can also include declarations which group or map events together such that a number of different event types can be consolidated under a single "meta-event". For example, when a checkbox value is changed, this action fires a change event. However, when a drop-down-combo-box's value is changed, it fires a exit event. For a form composer user 430, this difference in event names is confusing as both event can be perceived as firing a change event. In order to overcome this problem, the form template 420 can include one or more declarations which group events under a single meta-event for presentation within the form composition environment when the respective form template 420 is selected for form composition. In another variation whilst the types of events with XFA forms are fixed, it can be desirable to allow the definition and propagation of custom events. The form template 420 allows the creation of domain specific events that can be broadcast to multiple objects.

In an XFA form, the value of one object may affect the run-time properties of other objects in the form. For example, if the "Married" checkbox is selected, then the "Spouse Name" field within the form can become visible and mandatory for the form to be completed successfully. In the XFA specification, these types of dependencies are managed via code associated with multiple objects and events. In a more complex scenario, with many dependencies, it can become very difficult to develop, maintain, and test these chains of dependencies.

The form generator 440 includes the capability to explicitly define which objects have dependencies on which other objects. The generated XFA form automatically manages this dependency graph, and can automatically ensure that any changes propagate to the appropriate dependent objects without any required coding.

In another variation, a designer may wish to design a form purely from a data perspective, without any consideration for the specific form object type or layout that will be used. The invention includes capabilities to design a form as a form specification, wherein the object types are data-oriented rather than visually oriented. For example, a database analyst may specify the data that is required to be captured, without specifying how that data is presented to the end user. For example, the database analyst may specify, in the form specification, data being of eight alphanumeric characters, rather than the specific object such as a text field object, a date field object, or numeric field object. A form designer can use the form specification for generating generic fields into specific form object types.

In some instances there is a requirement for small variations to an electronic form. This occurs particularly when an electronic form is processed within different departments of an organisation. For example, a particular section of a form may be editable when a first user fills in the form. However, the first section can become un-editable (i.e read-only) when the form is processed by a second user. The form generator 440 includes the capability to create a single form definition file 420 that defines these variants. The variants are currently implemented as sections of the form, wherein the contents may be editable, read-only, or hidden at different processing stages. The physical manifestation of these variants can be either implemented at runtime, by dynamically modifying the electronic form 350, or at generation time, by generating two different variants of the form 350.

It will be appreciated that whilst the current embodiments have been described in relation to generating electronic forms built using Adobe PDF/XFA technology, it is possible that the process described herein may be extended to other types of XML-based electronic forms.

The above embodiments may take the form of an entirely hardware embodiment, an entirely software embodiment, firmware, or an embodiment combining software and hardware aspects.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A server processing system for generating an electronic form, wherein the server processing system is in communication with a client processing system as part of a distributed system, the server processing system comprising:
   a hardware component including at least one electronic communication module for communicating with the client processing system;
   a hardware storage component that stores data associated with an electronic form; and
   a processor configured generating an electronic form according to the communications with the client processing system, wherein the electronic form is generated by:
   receiving, from the client processing system, selection data indicative of a selected form template, wherein the form template is indicative of a form definition file including a reference to a style sheet, the style sheet being a distinct file that is separate to the form definition file which defines one or more property modifications to be applied when the server processing system generates the electronic form,
   transferring, to the client processing system, environment data indicative of a form composition environment including a plurality of components available for composing a form,
   receiving, from the client processing system, form composition data indicative of a user composing, within the form composition environment, a form composition including one or more components selected by the user,
   generating the electronic form wherein one or more default properties of the form composition are modified by the server processing system in accordance with the one or more property modifications defined by the style sheet to generate the electronic form, and
   transferring, to the client processing system, the generated electronic form,
   wherein the form definition file includes a reference to a descriptor file which defines one or more property modifications for a dedicated component type, wherein the server processing system applies a prioritised implementation of the one or more property modifications of the style sheet and the descriptor file when generating the electronic form in instances where at least some of the one or more property modifications conflict, wherein the file has a higher priority than the style sheet.

2. The server processing system according to claim 1, wherein the style sheet defines one or more property modifications to be applied to one or more components of a component type when generating the electronic file.

3. The server processing system according to claim 1, wherein at least one of the components of the form composition is a composite component comprising of a plurality of child components, wherein the server processing system is configured to:
   determine the plurality of child components of the composite component; and
   modify one of more of default properties of at least one of the child components in accordance with the style sheet to generate the form.

4. The server processing system according to claim 1, wherein the style sheet is indicative of a mapped property which modifies the presentation of a selectable property of at least one of the available components in the form composition environment, wherein upon the user interacting with the form composition environment to view or modify the selectable property, the form composition environment presents the mapped property in accordance with the style sheet.

5. The server processing system according to claim 1, wherein each base component is a fragment of XML code, wherein the server processing system modifies the XML code of at least some of the base components according to the one or more property modifications defined by the style sheet to generate the electronic form.

6. A client processing system for use in generating an electronic form, wherein the client processing system is in communication with a server processing system as part of a distributed system, the client processing system comprising:
   a hardware component including at least one electronic communication module for communicating with the server processing system;
   a hardware storage component that stores data associated with an electronic form; and
   a processor configured for use in generating an electronic form according to the communications with the server processing system, wherein the electronic form is generated by:
      transferring, to the server processing system, selection data indicative of a selected form template, wherein the form template is indicative of a form definition file including a reference to a style sheet, the style sheet being a distinct file that is separate to the form definition file which defines one or more property modifications to be applied when the server processing system generates the electronic form;
      receiving, from the server processing system, environment data indicative of a form composition environment including a plurality of components available for composing a form;
      generating form composition data indicative of a user composing, within the form composition environment, a form composition including one or more components selected by the user;
      transferring the form composition data to the server processing system for generating the electronic form, wherein one or more default properties of the form composition are modified by the server processing system in accordance with the one or more property modifications defined by the style sheet to generate the electronic form; and
      receiving, from the server processing system, the generated electronic form,
   wherein the form definition file includes a reference to a descriptor file which defines one or more property modifications for a dedicated component type, wherein the server processing system applies a prioritised implementation of the one or more property modifications of the style sheet and the descriptor file when generating the electronic form in instances where at least some of the one or more property modifications conflict, wherein the file has a higher priority than the style sheet.

7. A computer implemented method for generating an electronic form in a computerized system, the computer implemented method comprising:
   obtaining selection data from a client processing system indicative of a selected form template, wherein the form template is indicative of a form definition file including a reference to a style sheet, the style sheet being distinct file that is separate to the form definition file which defines one or more property modifications to be applied when the server processing system generates the electronic form;
   presenting a form composition environment by the client processing system including a plurality of components available for composing a form;
   at the client processing system, generating form composition data indicate of a user composing environment, a form composition including one or more components selected by the user; and
   at the server processing system, generating the electronic form based upon the form composition data, wherein one or more default properties of the form composition are modified by the server processing system in accordance with the one or more property modifications defined by the style sheet to generate the electronic form,
   wherein the style sheet defines at least some of the one or more property modifications to be applied by the computerized system to one or more of the components based on a component type when generating the electronic form, and
   wherein the form definition file includes a reference a descriptor file which defines one or more property modifications for a dedicated component type, wherein the server processing system applies a prioritised implementation of the one or more property modifications of the style sheet and the descriptor file when generating the electronic form in instances where at least some of the one or more property modifications conflict, wherein the descriptor file has a higher priority than the style sheet.

8. The computer implemented method according to claim 7, wherein the computerized system is a distributed system including the server processing system in communication with the client processing system.

9. The computer implemented method according to claim 8, wherein the server processing system is configured to:
   receive, from the client processing system, the selection data indicative of the selected form template;
   transfer, to the client processing system, the environment data indicative of the form composition environment;
   receive, from the client processing system, the form composition data indicative of the user composing, within the form composition environment, the form composition including the one or more components selected by the user;
generate the electronic form based upon the form composition data; and
transfer, to the client processing system, the generated electronic form.

10. The computer implemented method according to claim 8, wherein the client processing system is configured to:
transfer, to the server processing system, the selection data indicative of the selected form template;
receive, from the server processing system, the environment data indicative of the form composition environment;
generate form composition data indicative of a user composing, within the form composition environment, the form composition including the one or more components selected by the user;
transfer the form composition data to the server processing system for generating the electronic form; and
receive, from the server processing system, the generated electronic form.

11. A server processing system for generating an electronic form, wherein the server processing system is in communication with a client processing system as part of a distributed system, the server processing system comprising:
a hardware component including at least one electronic communication module for communicating with the client processing system;
a hardware storage component that stores data associated with an electronic form; and
a processor configured generating an electronic form according to the communications with the client processing system, wherein the electronic form is generated by:
receiving, from the client processing system, selection data indicative of a selected form template indicative of one or more component templates, each component template defining one or more property modifications to a respective base component, wherein each component templates defines a subset of modifiable properties of the respective base component that are modifiable by the user and a remaining subset of modifiable properties of the respective base component that are encapsulated;
transferring, to the client processing system, environment data indicative of a form composition environment including a plurality of components available for composing a form;
receiving, from the client processing system, form composition data indicative of a user composing, within the form composition environment, a form composition using at least one of the available components which is a base component having an associated component template, wherein the form composition data is indicative of a form definition file and one or more references to at least one of the component templates;
generating the electronic form based upon the form composition data, wherein the server processing system uses each reference to at least one or more components templates in the form definition file to apply the one or more property modifications to the respective base component; and
transferring, to the client processing system, the generated electronic form,
wherein the form definition file includes a reference to a descriptor file which defines one or more property modifications for a dedicated component type, wherein the server processing system applies a prioritised implementation of the one or more property modifications of the style sheet and the descriptor file when generating the electronic form in instances where at least some of the one or more property modifications conflict, wherein the file has a higher priority than the style sheet.

12. A client processing system for use in generating an electronic form, wherein the client processing system is in communication with a server processing system as part of a distributed system, the client processing system comprising:
a hardware component including at least one electronic communication module for communicating with the server processing system;
a hardware storage component that stores data associated with an electronic form; and
a processor configured for use in generating an electronic form according to the communications with the server processing system, wherein the electronic form is generated by:
transferring, to the server processing system, selection data indicative of a selected form template indicative of one or more component templates, each component template defining one or more property modifications to a respective base component, wherein each component templates defines a subset of modifiable properties of the respective base component that are modifiable by the user and a remaining subset of modifiable properties of the respective base component that are encapsulated;
receiving, from the server processing system, environment data indicative of a form composition environment including a plurality of components available for composing a form;
generating form composition data indicative of a user composing, within the form composition environment, a form composition using at least one of the available components which is a base component having an associated component template, wherein the form composition data is indicative of a form definition file and one or more references to at least one of the component templates;
transferring the form composition data to the server processing system for generating the electronic form, wherein the server processing system uses each reference to at least one or more components templates in the form definition file to apply the one or more property modifications to the respective base component; and
receiving, from the server processing system, the generated electronic form,
wherein the form definition file includes a reference to a descriptor file which defines one or more property modifications for a dedicated component type, wherein the server processing system applies a prioritised implementation of the one or more property modifications of the style sheet and the descriptor file when generating the electronic form in instances where at least some of the one or more property modifications conflict, wherein the file has a higher priority than the style sheet.

13. A computer implemented method for generating an electronic form in a computerized system, the computer implemented method comprising:
obtaining selection data from a client processing system indicative of a selected form template including one or more component templates, each component template defining one or more property modifications to a respective base component, wherein each component templates defines a subset of modifiable properties of the respective base component that are modifiable by the user and a remaining subset of modifiable properties of the respective base component that are encapsulated;

at the client processing system, presenting a form composition environment including a plurality of components available for composing a form;

at the client processing system, generating form composition data indicative of a user composing, within the form composition environment, a form composition using at least one of the available components which is a base component having an associated component template, wherein the form composition data is indicative of a form definition file and one or more references to at least one of the component templates; and at a server processing system, generating the electronic form based upon the form composition data by applying the one or more property modifications to the respective base component associated with each referenced component template, wherein the style sheet defines at least some of the one or more property modifications to be applied by the computerized system to one or more of the components based on a component type when generating the electronic form, and wherein the form definition file includes a reference a descriptor file which defines one or more property modifications for a dedicated component type, wherein the server processing system applies a prioritised implementation of the one or more property modifications of the style sheet and the descriptor file when generating the electronic form in instances where at least some of the one or more property modifications conflict, wherein the descriptor file has a higher priority than the style sheet.

* * * * *